June 20, 1933.  C. McKINNON  1,915,001
MINING AND LOADING OR LOADING MACHINE
Filed April 20, 1933  2 Sheets-Sheet 1
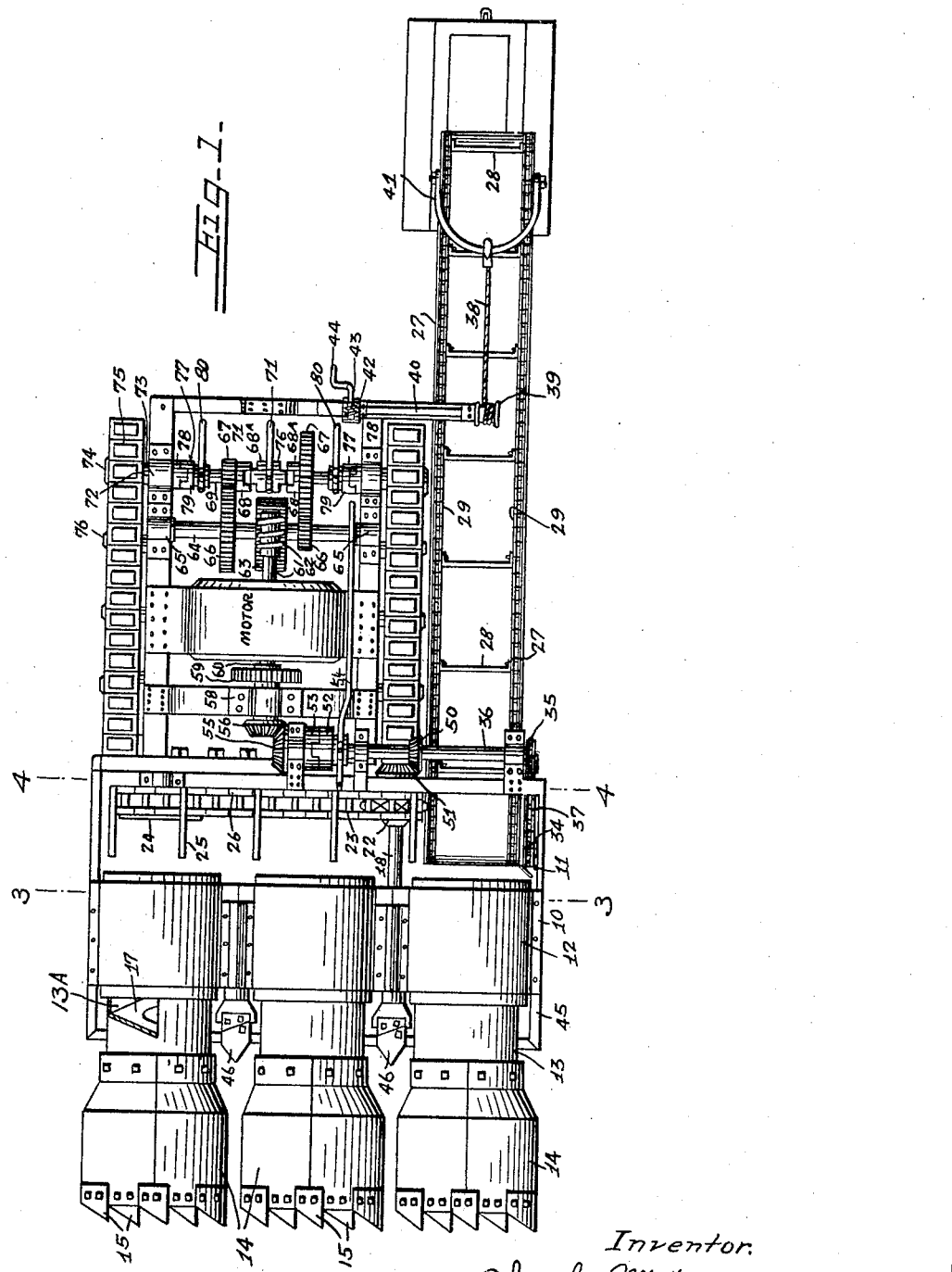
Inventor.
Charles McKinnon

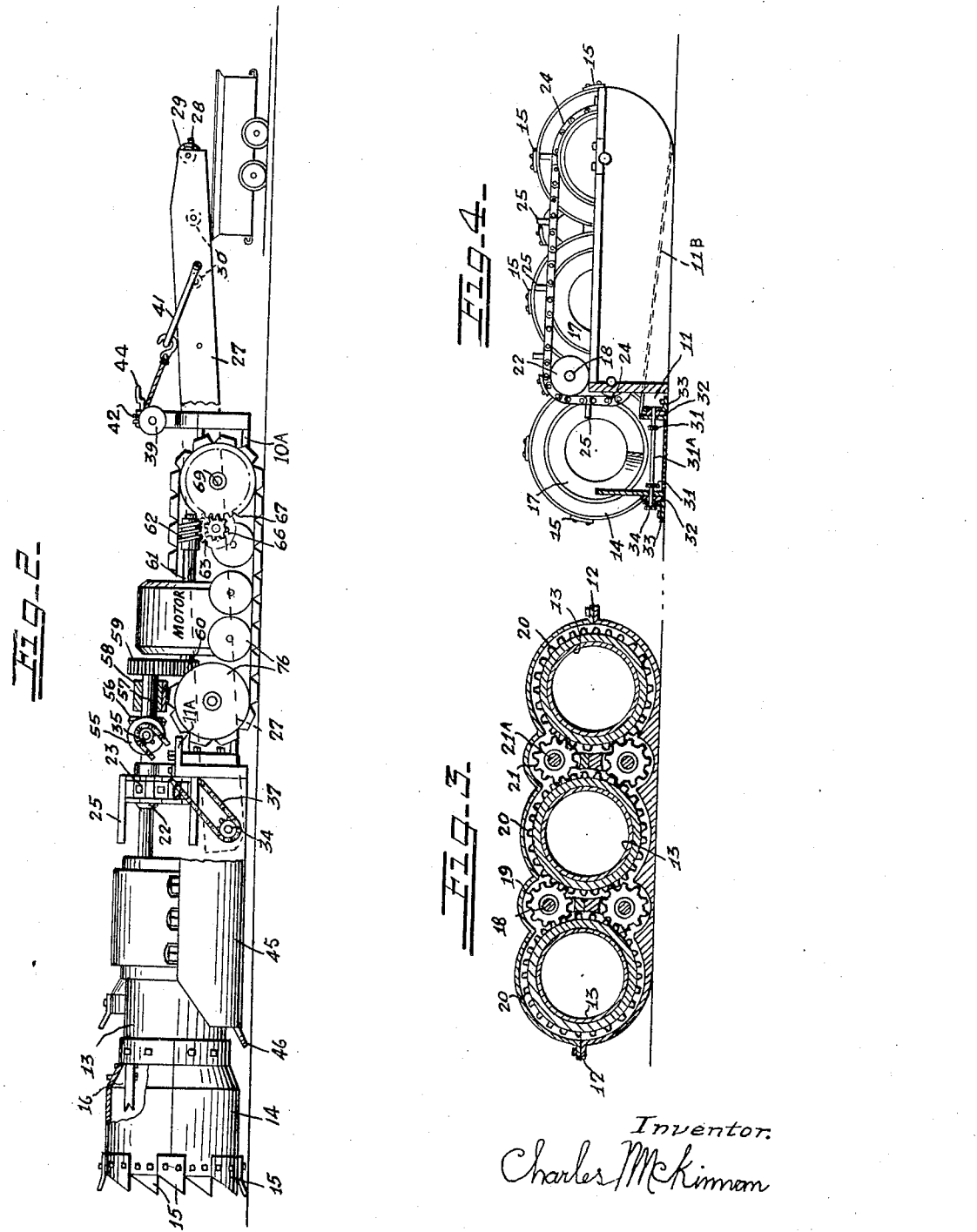

Patented June 20, 1933

1,915,001

UNITED STATES PATENT OFFICE

CHARLES McKINNON, OF MINDENMINES, MISSOURI

MINING AND LOADING OR LOADING MACHINE

Application filed April 20, 1933. Serial No. 667,064.

My invention comprises a machine designed to mine and load coal or other material, without the use of explosives, which will reduce the danger of mining to a considerable extent and at the same time greatly cheapening the cost of mining operations.

For accomplishing the desired result with my invention, use is made of a "Caterpiller" tractor in order to propel the machine into the material being worked; cutting, and rearwardly extending conveying mechanism is carried on the machine for conveying the material to the rear end of the machine and discharging it into a mine car or other suitable receiver.

A further object of my invention is to provide a machine carrying from two to six feet cutting heads and is driven forwardly a distance of two hundred feet or more from the first entry to the second entry, and is then turned around for cutting back to the first entry. Since the required width of pillars has been left between cuts, a flexible tube may be used for auxiliary ventilation; this system permits the setting of timbers close to the working face, which affords adequate protection for the operator.

With the above and other objects in view, the invention consists in novel construction and arrangement of parts, as hereinafter set forth.

In the accompanying drawings:

Figure 1 is a plan view disclosing, in general, the several features of the invention.

Figure 2 is a view in side elevation illustrating the inclined conveyor and core breaking teeth within the cutting heads.

Figure 3 is a transverse vertical sectional view of the machine taken on the line 3—3 in Fig. 1.

Figure 4 is a transverse view taken on the line 4—4 in Fig. 1, showing the inclined plate and the lower end of the inclined trough. Similar numerals refer to similar parts throughout the several views.

Referring more particularly to the views, I provide a cutter frame 10 terminating at the rear end in trough 11, the rear end of said trough being provided with a plate 11A; which is bolted to and projects rearwardly over the forward portion of the tractor frame 10A, and journaled on the outer frame 10; extending through the bearings 12 are a plurality of spaced rotatable tubes 13, having secured to their outer ends removable cutting heads 14 provided with removable teeth 15, the said cutting heads being made in a number of parts; core breaking teeth 16, which break up in the coal to the desired size, being secured within the cutting heads 14; spiral conveyors 17 are attached within the said tubes 13 and extend into the cutting heads.

A shaft 18 is journaled longitudinally of the cutter frame 10, having a gear 19 secured to the outer end in mesh with the tube gears 20, which mesh, with an idler gear 21; near the end of the shaft 18, is a sprocket wheel 22 having an endless chain 23 adapted to operate over the said sprocket, and rollers 24, suitable conveyor plates 25 being secured to the chain 23 to constitute a belt conveyor 26, the chain 23 being so positioned relatively to the trough 11, that the conveyor plates 25 will operate to pass through and over an inclined plate 11B secured to the bottom of the trough 11. (See Figure 4.)

Trough 27 has a hinged connection near the lower front end, with trough 11; plates 28 are connected at their outer ends to a link of each of the two endless chains 29, adapted to pass over rollers 30 and sprocket wheels 31 fastened to a shaft 31A, which is journaled in bearings 32 that extend out from the lower sides of the inclined trough 27; said bearings fit into the eyes of brackets 33, secured to the bottom of trough 11, shown in Figure 4. The outer end of shaft 31A is provided with a driving sprocket 34, which is connected to a sprocket 35 on a transverse shaft 36 by the endless chain 37 adapted to operate over the same; the inclined trough 27 is raised and lowered by means of a cable 38 which is wound on a drum 39, secured to the outer end of a shaft 40; the outer end of cable 38 is attached to a bail 41, which is bolted to the forward end of trough 27. Secured to the inner end of shaft 40 is a worm wheel 42 driven by a worm 43 formed on the outer end of handle 44; secured to the forward end of the cutter frame 10 is a plate 45, provided with teeth 46, which break up the ridges of coal between the tubes 13, which is taken into the tubes through an opening 13A if desired, teeth 47 being secured to the upper rear end of the cutter frame 10.

50 is a bevel gear on shaft 36, meshing with a bevel gear 51, secured to the rear end of shaft 18. 52 and 53 are jawed clutch members; 52 is splined on shaft 36 and operated by handle 54. 55 and 56 are intermeshing bevel gears secured to the outer ends of shafts 36 and 57, which is journaled in bearing 58, shaft 57 having secured to the inner end a gear meshing with a pinion 60 which is secured to the outer end of a motor shaft 61 mounted on the tractor frame 10A. Secured to the rear end of motor shaft 61 is a worm 62 meshing with a worm wheel 63 secured to shaft 64, which is journaled in bearings 65; near the center of shaft 64 are gears 66 meshing with gears 67, the last-mentioned gear having teeth 68 formed on its inner side to form one-half of a jawed clutch-member 68A; the mentioned gears run loose on shaft 69; splined on shaft 69 is a double-jawed clutch-member 70 operated by handle 71 for engaging or disengaging clutch-members 68A.

Secured to the outer end of sleeves 72 which extend through bearings 73 on frame 10A are sprocket-wheel 74 having traction chains 75, adapted to pass over said sprockets and rollers 76; the inner ends of sleeves 72 have teeth 77 cut in them, to form one-half of the jawed clutch-members 79; the other half of the jawed clutch-members 79 are splined on shaft 69 and operated by handles 80.

The operation of my improved mining and loading machine is as follows:

The machine is positioned in the mine with the cutting heads 14 abutting against the face of the material to be cut; the motor is now operated and having suitable connection between the motor and tubes 13, which will cause the tubes 13 and cutting-heads 14 to revolve so that the teeth 15 will cut into coal which will be broken up by core breaking-teeth 16 secured within the cutting-heads 14, the spiral conveyors 17 being secured to the tubes 13, will convey the coal to the inner ends of said tubes and dump it into the trough 11; now as the chain 23 has the conveyor plates 25 secured thereto and operable in the trough 11 the mentioned plates will push the coal or other material that is being cut, toward one end of trough 11 on to the inclined trough 27, which will convey the material to the rear end of the machine and discharge into a mine-car or other suitable receiver being provided for conveying out products out of the mine in any suitable manner.

By moving handle 71 to the left, machine is moved forward by the traction chains 75 at slow speed; moving handle 71 to the right and reversing the motor, machine is moved in either direction at increased speed; if it is desired to retain the cutting and conveying parts in a stationary position, the lever 54 is operated; the machine can be turned from left to right by engaging or disengaging clutch-members 80.

A machine of this type would be useful in a large number of mining methods, including room and pillar and long-wall work, top and bottom brushing, also tunneling and other mining systems.

Having thus described my invention, what I claim as new, and desire to secure by Letters Patent, is:

1. A mining machine comprising a plurality of horizontal longitudinally arranged cutting cylinders, a conveyor extending transversely of the rear ends of said cylinders for receiving material therefrom, a motor to the rear of said conveyor, supporting and propelling devices on each side of said motor and driven from one end thereof, and means driven from the other end of said motor for rotating said cutting cylinders.

2. A mining machine comprising a plurality of horizontal longitudinally arranged cutting cylinders, a conveyor extending transversely of the rear ends of said cylinders for receiving material therefrom, a motor to the rear of said conveyor, supporting and propelling devices on each side of said motor and driven from one end thereof, and means driven from the other end of said motor for rotating said cutting cylinders, including a transverse shaft having a clutch for operatively connecting the cutting and conveying means with the propelling device, a rearwardly extending conveyor operable in conjunction with the transversely arranged conveyor for conveying the material to a convenient place of disposal, and raising and lowering means associated with rearwardly extending conveyor.

In testimony whereof I affix my signature.

CHARLES McKINNON.